United States Patent
Wasmund et al.

(10) Patent No.: US 6,506,229 B2
(45) Date of Patent: Jan. 14, 2003

(54) TWO EXPERIMENTAL TRIALS USING THE SYSTEM 10 DEMONSTRATE THE EFFICACY OF THE PRESENT PROCESS:

(75) Inventors: Eric Bain Wasmund, Hamilton (CA); Griffith Oswald Richard Williams, Dyfed (GB); Kirt Kenneth Cushnie, Waterdown (CA); Randal Mark Shaubel, Oakville (CA)

(73) Assignee: Inco Limited, Toronto (CA)

( * ) Notice: Subject to any disclaimer, the term of this patent is extended or adjusted under 35 U.S.C. 154(b) by 0 days.

(21) Appl. No.: 09/756,253

(22) Filed: Jan. 8, 2001

(65) Prior Publication Data

US 2002/0088306 A1 Jul. 11, 2002

(51) Int. Cl.[7] ................................................. B22F 9/28
(52) U.S. Cl. ............................. 75/362; 75/371; 75/374
(58) Field of Search ........................ 75/362, 370, 371, 75/373, 374

(56) References Cited

U.S. PATENT DOCUMENTS

| | | |
|---|---|---|
| 1,138,201 A | 5/1915 | Ellis |
| 1,759,658 A | 5/1930 | Mittasch et al. |
| 1,759,661 A | 5/1930 | Muller et al. |
| 3,228,882 A | 1/1966 | Harle et al. ................ 252/62.5 |
| 3,504,895 A | 4/1970 | Goodrich et al. ............... 266/1 |
| 4,252,671 A | 2/1981 | Smith ......................... 252/430 |
| 4,808,216 A * | 2/1989 | Kageyama et al. ............ 75/362 |
| 5,064,464 A * | 11/1991 | Sawada et al. ................ 75/362 |
| 5,137,652 A | 8/1992 | Nakatani et al. .......... 252/62.51 |
| 6,033,624 A | 3/2000 | Gonsalves et al. ............. 419/48 |
| 6,428,601 B2 * | 8/2002 | Terekhov ....................... 75/362 |

FOREIGN PATENT DOCUMENTS

| | | |
|---|---|---|
| DE | 241823 | 1/1910 |
| GB | 974627 | 11/1964 |

OTHER PUBLICATIONS

C. Ellis, *Hydrogenation of Organic Substances Including Fats and Fuels*, 3$^{rd}$ ed., Van Nostrand, N.Y., 1930, pp. 164–167.

E. Papirer, P. Horny, et al., "The Preparation of a Ferrofluid Decomposition of Dicobalt Octacarbonyl", *Journal of Colloid and Interface Science*, vol. 94, No. 1, Jul. 1983, pp. 220–228.

* cited by examiner

*Primary Examiner*—George Wyszomierski
(74) *Attorney, Agent, or Firm*—Edward A. Steen

(57) ABSTRACT

A continuous method for generating substantially submicron sized metal particles in a liquid dispersion of known viscosity. Metal carbonyl gas and an inert carrier gas, with an optional dilutant gas, are introduced into a heated liquid bath wherein the metal carbonyl decomposes into submicron sized pure metal particles. The particles are suspended in the liquid. The liquid is processed to form slurries and pastes.

12 Claims, 1 Drawing Sheet

TWO EXPERIMENTAL TRIALS USING THE SYSTEM 10 DEMONSTRATE THE EFFICACY OF THE PRESENT PROCESS:

TECHNICAL FIELD

The instant invention relates to metal powders in general and, more particularly, to a continuous method for producing submicron sized metal particles. These particles are especially useful for inclusion in slurries and pastes destined for electrochemical cells such as batteries and for capacitors.

BACKGROUND ART

As discovered by Mond and Langer in 1889, nickel tetracarbonyl-$Ni(CO)_4$—readily decomposes into essentially pure metallic nickel and carbon monoxide within the temperature range of about 150–315° C. A major drawback of the exquisite Mond process is that nickel tetracarbonyl is a highly dangerous toxin. Similarly, carbon monoxide must be treated with extreme care. Accordingly, few organizations throughout the world employ the method.

The multi-layer capacitor paste market requires submicron (less than one micron) nickel powders with no agglomerated particles larger than about one micron in size.

Most commercial fine nickel powders are made by chemical vapor deposition ("CVD"), chloride reduction or aqueous precipitation. These current technologies are very expensive to scale up.

The resultant nickel powders used by multi-layer capacitor manufacturers are initially sold as dry powders. The fine powders are subsequently dispersed into a liquid to form a slurry which is part of the paste making process. Manufacture of the paste adds a significant cost to the final product.

For decades, assignee has decomposed nickel (tetra) carbonyl vapors in the gas phase to manufacture a variety of fine pure nickel powders. Extra-fine powders, with a primary particle size of less than about 0.5 microns, may be made by gas phase decomposition of the nickel carbonyl at temperatures above about 400° C. Unfortunately, under these conditions, particle collisions create significant opportunities for sintering resulting in powders containing some undesirable particles in excess of about one micron.

All current techniques for producing dispersions containing submicron particles require expensive multi-step batch operations to manufacture the desired slurries and pastes.

During the early development of nickel carbonyl technology around the turn of the last century, it was recognized that the passage of nickel carbonyl with hydrogen through a fluid resulted in the catalyzation and formation of organic compounds. See German patent 241,823 (dated 1911) to Shukoff.

Similarly, U.S. Pat. No. 1,138,201 to Ellis teaches the hydrogenation of heated oils. The nickel carbonyl is utilized as a source of fine catalytic nickel within the oil.

In both instances, the nickel particles are separated from the liquid leaving behind the hydrogenated compounds. However, apparently there was no recognition that a subsequently treated liquid dispersion, such as a paste or slurry, with entrained nickel particles therein had any utility.

There is a need for a continuous cost-effective process that produces submicron metal powders in liquid dispersions, thereby short-circuiting a number of intermediate processing steps.

SUMMARY OF THE INVENTION

There is provided a continuous low cost process for making a liquid dispersion of submicron sized particles of pure metal.

Metal carbonyl vapor bubbles are introduced in a heated liquid with an inert carrier gas. As the bubbles rise, the metal carbonyl decomposes into submicron metal particles without agglomerating while simultaneously dispersing throughout the liquid. The resultant nickel primary particles have an average diameter of about 0.1 microns, an order of magnitude smaller than most current commercial nickel particles.

PREFERRED EMBODIMENT OF THE INVENTION

Figure 1:
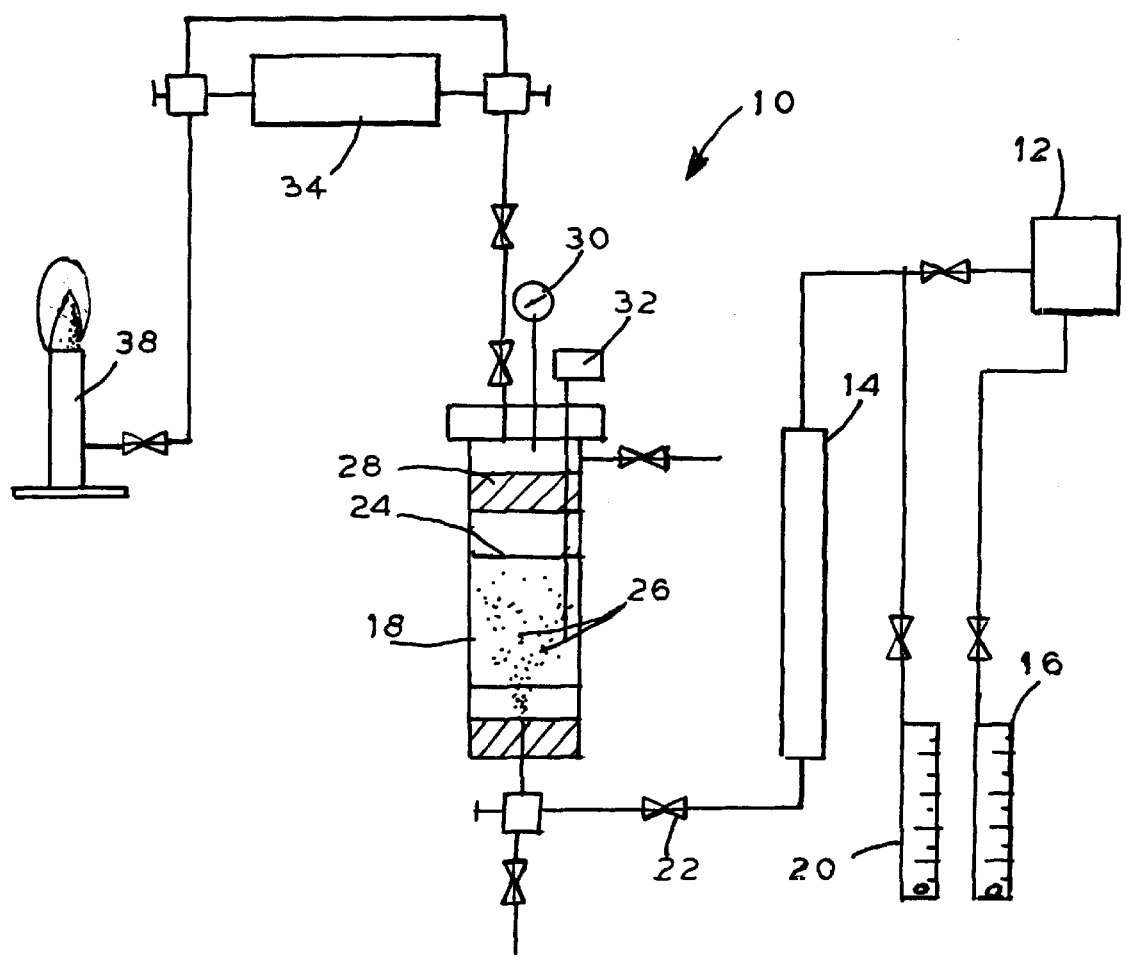
FIG. 1 is a schematic flow diagram of an embodiment of the invention.

Referring to FIG. 1, there is shown a prototype system 10 for producing a submicron nickel particle entrained liquid.

Although the emphasis of the discussion is directed towards nickel, the present method is applicable to other metals that form carbonyl compounds such as iron, cobalt, chromium, and molybdenum.

"Submicron" means less than about one micron.

"Inert carrier gas" means a gas that does not directly react with the nickel carbonyl vapors or hot liquid. However, it may affect the speed and extent of reaction, in accordance with standard kinetic and thermodynamic principles.

A source of gaseous nickel carbonyl 12 is supplied to a static mixer 14 via an inert carrier gas. The inert carrier gas, preferably carbon monoxide, from supply 16 modulates the flow rate and quantity of the $Ni(CO)_4$ supplied to the mixer 14 and ultimately to a heated reactor vessel 18, preferably an autoclave. A source of optional nitrogen or other inert dilution gas 20 augments the $Ni(CO)_4$ feed to the vessel 18 as needed. The carbon monoxide serves to protect the carbonyl from decomposing prior to contact with a liquid 24 and may affect the particle sizes.

It should be apparent to those skilled in the art that due to the dangerous nature of nickel carbonyl, strict appropriate safeguards must be utilized to protect operating personnel and the environment from carbonyl and carbon monoxide leakage. Accordingly, all the pumps, conduits, valves, sensors, etc. must be carbonyl rated.

The gaseous $Ni(CO)_4$ and carrier gas are routed to the vessel 18 by conduit 22. It is preferred to introduce the carbonyl vapor towards the bottom of the vessel 18 so that it will bubble 26 up through the liquid 24 disposed within the vessel 18. A demister 28 or similar apparatus strips any liquid from being carried over by the carbon monoxide gas flowing out of the vessel 18.

Instrumentation such as pressure gauge 30, temperature probe 32 and other processing and safety equipment (not shown) assist in regulating and controlling the process with the reactor 18.

The freed carbon monoxide gas passes through a decomposer 34 to break down the toxic carbon monoxide gas. A final flame decomposer 38 both neutralizes any remaining carbon monoxide and provides visual confirmation that the exhaust gas stream is within safe limits.

The submicron nickel particles are generated by decomposing the nickel carbonyl vapors directly in the hot liquid disposed in the vessel 18. As the particles are formed, they are protected from surface reactions and collisions by a liquid-solid boundary layer. Simultaneously, by maintaining the liquid at a fixed uniform temperature, the resulting particles have a more uniform microstructure.

Gaseous nickel carbonyl admixed with the carrier gas enters the vessel 18 and is introduced into the heated liquid 24 via any suitable distributor known to those in the art. For example, a cooled distributor such as a nozzle, bubbler, porous disk or perforated plate allows the vapors to bubble up through the liquid 24. It is useful to cool the distributor to prevent the nickel from building up on the apparatus. By adjusting the flow rate, size distribution of the bubbles, gas concentration and the temperature of the liquid 24, the physical dimensions of the nickel particles may be controlled.

The inert carrier gas acts as a flow expediter.

As the gas bubbles rise through the liquid 24, the nickel carbonyl will decompose within the bubbles and/or dissolve into the liquid prior to decomposing. The decomposition of the nickel carbonyl compound will create a liquid dispersion of submicron nickel particles with no significant amount of agglomerated particles greater than about 1 micron. The decomposition reactions are functions of the temperature, the type of liquids selected, the gas concentration of the metal carbonyl, and the fluid dynamics of the gaseous flow rate.

The resulting solid/liquid dispersion can be thickened to the desired solids content and viscosity by any number of conventional operations such as evaporation, centrifugation, magnetic separation, and ultra-filtration.

By directly fabricating the nickel particulate entrained liquid dispersion, a number of conventional preexisting processing steps for making pastes comprised of nickel particles are eliminated.

Two experimental trials using the system 10 demonstrate the efficacy of the present process:

EXAMPLE ONE

Two liters per minute of gaseous nitrogen (90%), nickel carbonyl (5%) and carbon monoxide (5%) were fed through a sintered disk distributor into the bottom of the vessel column 18 consisting of 350 ml of liquid heated to 160° C. at essentially atmospheric pressure (See FIG. 1). Tests were performed in (1) decyl alcohol (CAS 112-30-1); (2) Flutec™ PP10 low vapor pressure fluorocarbon (CAS 307-08-04); (3) silicone oil (CAS 63148-58-3); (4) dodecane (CAS 112-40-3); and (5) alpha-terpineol (CAS 10482-56-1). Complete decomposition was confirmed by the color of the flame 38 during incineration in the decomposer 34. The experiment was stopped after about eight minutes after enough product was produced for evaluation. The liquid was cooled and purged at room temperature. Preliminary analysis of the microstructure by scanning electron microscope ("SEM"), dynamic light scattering and x-ray diffraction ("XRD") analysis confirmed that the bulk of the nickel particles were approximately 0.1 micron. In particular, nickel particle doped alpha-terpineol is used as capacitor electrode paste.

EXAMPLE TWO

Two liters per minute of gaseous nitrogen (90%), nickel carbonyl (5%) and carbon monoxide (5%) were fed through a sintered disk into the bottom of the vessel column 18, consisting of 350 ml of heated alpha-terpineol (CAS 10482-56-1) for about eight minutes at essentially atmospheric pressure. The experiment was repeated at 120° C., 130° C., 140° C., and 160° C. It was found that no nickel powder was made at 120° C., indicating that there was no reaction or a significant build-up of nickel on the internal parts of the decomposer 34. Higher temperatures resulted in nickel particle production.

Although the above experiments were stopped after about eight minutes to evaluate the product, the reactions appear to be almost instantaneous. Accordingly, a continuous regimen will result in the product being bled off at a relatively constant rate; the rate being a function of the input loading parameters, temperature and volume of liquid.

While in accordance with the provisions of the statute, there is illustrated and described herein specific embodiments of the invention. Those skilled in the art will understand that changes may be made in the form of the invention covered by the claims and that certain features of the invention may sometimes be used to advantage without a corresponding use of the other features.

The embodiments of the invention in which an exclusive property or privilege is claimed are defined as follows:

1. A method for producing a liquid dispersion containing non-agglomerated submicron metal particles, the method comprising:
   a) providing a liquid bath in a vessel;
   b) mixing a metal-carbonyl gas with a flow expediting inert carrier gas containing carbon monoxide to form a metal-carbonyl gas mixture;
   c) introducing the metal-carbonyl gas mixture into the liquid bath;
   d) bubbling the metal-carbonyl gas mixture through the liquid bath;
   e) causing at least a portion of the metal-carbonyl gas to decompose within the liquid bath to form metal particles of predetermined size and remain therein; and
   f) forming the liquid dispersion of metal particles with no significant amount of agglomerated particles in the liquid bath with a predetermined viscosity.

2. The method according to claim 1 wherein the liquid bath is heated in excess of about 120° C.

3. The method according to claim 1 wherein the metal-carbonyl gas is selected from the group consisting of nickel carbonyl, iron carbonyl, cobalt carbonyl, chromium carbonyl, and molybdenum carbonyl.

4. The method according to claim 1 wherein the size of at least most of the metal particles is less than about 1 micron.

5. The method according to claim 1 wherein the liquid bath is selected from the group consisting of decyl alcohol, low vapor pressure fluorocarbon, silicon oil, dodecane, and alpha-terpineol.

6. The method according to claim 1 wherein the liquid dispersion of metal particles is thickened.

7. The method according to claim 6 wherein the liquid dispersion of metal particles is thickened by a method selected from the group consisting of evaporation, centrifugation, magnetic separation and ultra-filtration.

8. The method according to claim 1 wherein the liquid dispersion is a slurry or paste.

9. The method according to claim 1 wherein a dilution gas is added to the metal-carbonyl gas mixture.

10. The method according to claim 9 including introducing about 90% dilution gas, about 5% metal-carbonyl gas and about 5% carbon monoxide to the liquid bath.

11. The method according to claim 9 wherein the dilution gas is nitrogen.

12. The method according to claim 9 including introducing about 90% nitrogen, about 5% nickel carbonyl gas and about 5% carbon monoxide to the liquid bath.

* * * * *

UNITED STATES PATENT AND TRADEMARK OFFICE
CERTIFICATE OF CORRECTION

PATENT NO.   : 6,506,229 B2
DATED        : January 14, 2003
INVENTOR(S)  : Wasmund et al.

It is certified that error appears in the above-identified patent and that said Letters Patent is hereby corrected as shown below:

<u>Title page, Item [54] and Column 1, lines 1-3,</u>
The correct title is:

-- METHOD FOR PRODUCING A LIQUID DISPERSION CONTAINING SUBSTANTIALLY SUBMICRON SIZED METAL PARTICLES --

Signed and Sealed this

Twenty-seventh Day of May, 2003

JAMES E. ROGAN
*Director of the United States Patent and Trademark Office*